United States Patent [19]

Collins et al.

[11] Patent Number: 5,415,069

[45] Date of Patent: May 16, 1995

[54] CHEMICALLY VAPOR DEPOSITED SAW GUIDES

[75] Inventors: Jerry Collins, Richardson; John Hoover, Denison; Al Latham, Lewisville, all of Tex.

[73] Assignee: Texas Instruments Incorporated, Dallas, Tex.

[21] Appl. No.: 959,504

[22] Filed: Oct. 9, 1992

Related U.S. Application Data

[63] Continuation of Ser. No. 734,367, Jul. 22, 1991, abandoned.

[51] Int. Cl.⁶ .......................... B26D 1/54; B27B 5/29
[52] U.S. Cl. .......................... 83/824; 83/820; 384/907.1; 427/249
[58] Field of Search .......... 83/824, 821, 825, 820, 83/425.3, 823; 384/42, 907.1; 427/249, 255, 255.2

[56] References Cited

U.S. PATENT DOCUMENTS

| | | | |
|---|---|---|---|
| 3,591,243 | 7/1971 | Knippenberg et al. | 384/907.1 X |
| 3,634,116 | 1/1972 | Woerner et al. | 427/249 |
| 3,797,354 | 3/1974 | Allison | 83/824 |
| 3,984,211 | 10/1976 | Hawkins | 83/488 X |
| 4,309,930 | 1/1982 | Wright | 83/821 X |
| 4,327,621 | 5/1982 | Voorhees | 83/821 X |
| 4,474,861 | 10/1984 | Ecer | 83/821 X |
| 4,563,928 | 1/1986 | Salomonsson | 83/820 X |
| 4,617,232 | 10/1986 | Chandler et al. | 427/249 X |
| 4,848,200 | 7/1989 | McGehee | 83/821 X |
| 4,869,929 | 9/1989 | Cabrera et al. | 427/255.2 X |
| 4,920,846 | 5/1990 | Duginske et al. | 83/820 |
| 4,966,789 | 10/1990 | Knapp et al. | 427/255 X |

FOREIGN PATENT DOCUMENTS 1316517 12/1989 Japan ................................ 384/907.1

OTHER PUBLICATIONS

Retrofits:Cost Cutting by Les Johnson, Reprinted from Hiballer forest magazine Feb./Mar. 1986 (2 pages).
Guide Systems, advertisement bulletin from PACIFIC/HOE, Pacific/Hoe Saw and Knife Company (11 pages).

Primary Examiner—Rinaldi I. Rada
Assistant Examiner—Clark F. Dexter
Attorney, Agent, or Firm—Robby T. Holland; Wade James Brady, II; Richard L. Donaldson

[57] ABSTRACT

Spacing and stabilization guides for saw blades have a coating of a chemically vapor deposited silicon carbide on the face of the guide that contacts the saw blade. The guides may be fixed or rotatable on mounting brackets.

8 Claims, 3 Drawing Sheets

CHEMICALLY VAPOR DEPOSITED SAW GUIDES

This application is a division of application Ser. No. 734,367, filed Jul. 22, 1991, now abandoned.

FIELD OF THE INVENTION

This invention relates to guides for saws, and more particularly to a saw guide using chemically vapor deposited silicon carbide materials.

BACKGROUND OF THE INVENTION

Saws used in wood saw mills use guides to stabilize and insure cutting accuracy of the saw blade. The guides are as important to a saw mill as the saw. Guides are used by both circular and band saws. Precision is required to eliminate waste and to produce accurate dimensional cutting of the saw.

Several materials have been used as saw guides. A wood from South America, Lignum Vitae, has been used. This is a hard oily wood. A phenolic material using cotton and graphite has been used. Another material made of soft low temperature metals has been molded into guides. An asbestos material was used, but has been discontinued because of environmental reasons. Some ceramic materials have been tried, but they are too brittle and score the saw blades. All of these materials need to be improved on. Guides from these materials have not had the strength to withstand the wear of the saw blade and require frequent replacements.

Basic requirements for guides are that they must withstand wear, not create heat, not wear the saw blade, run with minimum or no lubrication, and be of a price that, when replaced, is not too costly. None or the prior art materials have all of these qualities.

SUMMARY OF THE INVENTION

The invention is to a saw blade guide and to the method of making which includes producing a guide face that is of a chemically vapor deposited silicon carbide (SiC) on a graphite base. The graphite base may be mounted on a support material such as aluminum or phenolic material. The guides may be either uniface or two faced for use between two circular saw blades.

The use of a silicon carbide face on graphite reduces thermal shock damage, reduces friction between the saw blade and the guide, provides better wear resistance, eliminates or reduces guide adjustment, and reduces saw mill down time in replacing guides.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT OF THE INVENTION

Figure 1:
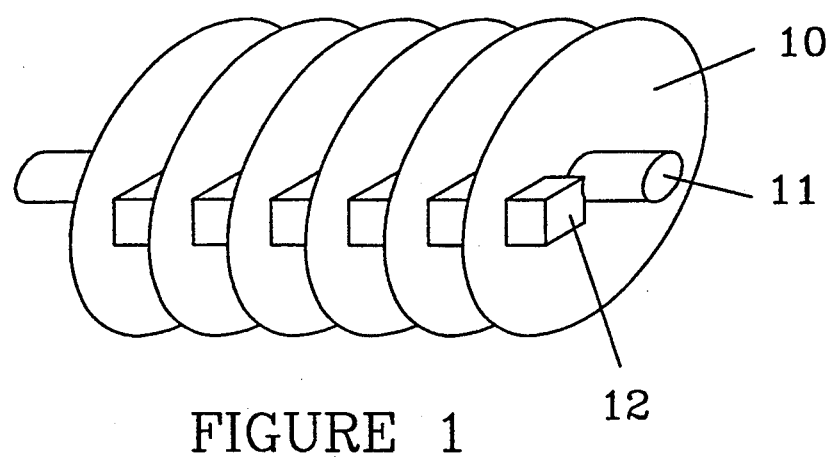
FIG. 1 is a pictorial representation of saw blade guides of the present invention between circular saw blades.

FIG. 1 is a pictorial illustration of a plurality of circular saw blades 10 spaced apart with a plurality of guides 12. Blades 10 are on shaft 11 and are turned by a motor (not illustrated). Guides 12 are used to space and support thin circular blades 10 to allow a smaller kerf (saw cut) and to provide more accuracy in blade spacing. Guides 12 are faced with a layer or coating of a silicon carbide that is chemically vapor deposited on a base of graphite (CVD SiC - Chemical Vapor Deposited Silicon Carbide). Ganged saw blades may be used when cutting several pieces of dimensional lumber with one pass, and in special applications when making multiple cuts in a single piece of wood. The guides are usually mounted in a fixed relationship to the rotating circular blades, and do not interfere with the cutting action of the blades.

Figure 2:
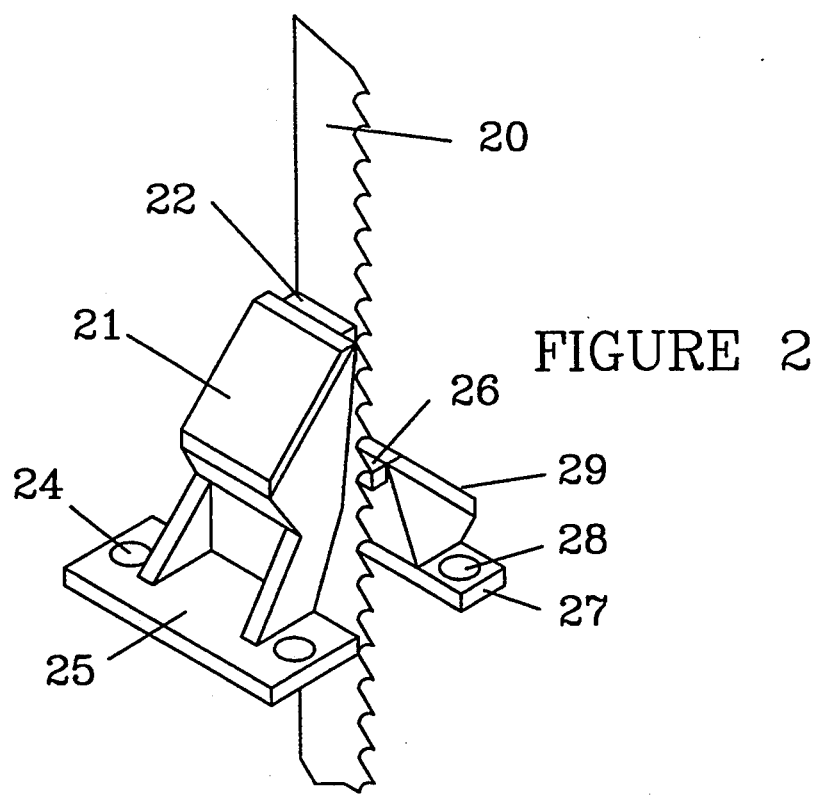
FIG. 2 illustrates using saw blade guides with a band saw blade.
Figure 5:
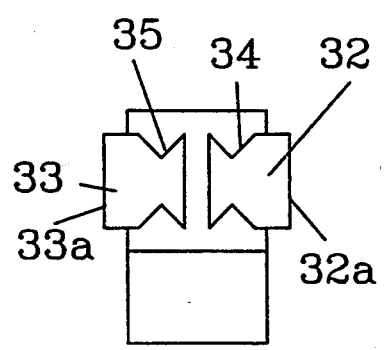
FIG. 5 is an end view of the guide of FIG. 3.
Figure 3:
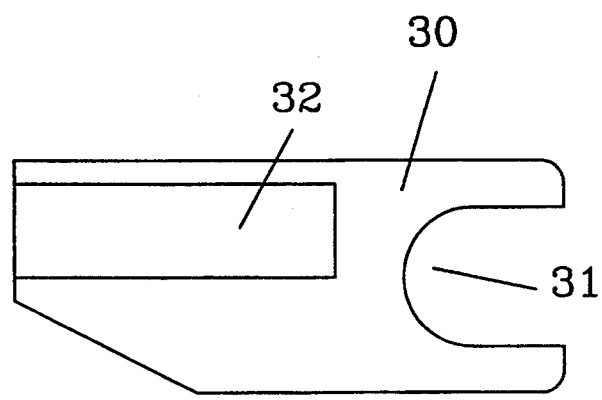
FIG. 3 illustrates the side view of an example of a guide for a circular saw blade.
Figure 4:
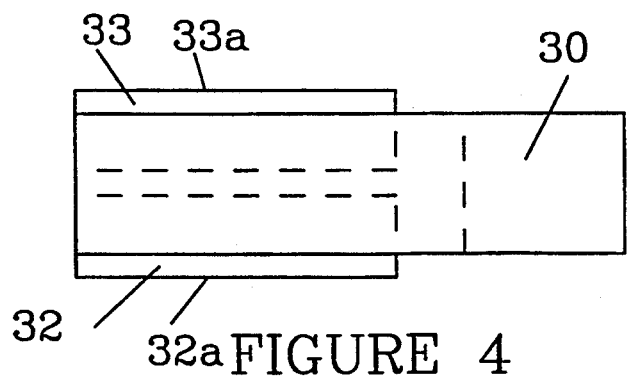
FIG. 4 is a top view of the guide of FIG. 3.

FIG. 2 illustrates the use of CVD SiC coated guides used with a band saw blade. At least two guides are placed on opposite sides of the blade to provide support and stability for the blade. Blade 20 is between guide[s] members 22 and 26. Guide[s] member 22 is supported on mount 21 that has a bracket 25 with holes 24 therein. Mount 21 is attached to a saw frame or other support device to hold the CVD SiC guide member 22 against the blade. CVD SiC guide member 26 is mounted on support 29 which has bracket 27 and holes 28 for attaching the guide support to a mounting surface (not illustrated). Each of guide members 22 and 26 has a guide face that is adjacent saw blade 20, FIGS. 3, 4 and 5 illustrate an example of a two-faced guide used with circular saw blades. In side view FIG. 3, mounting bracket 30 has an opening 31 which may be placed over the shaft, turning the saw blade, between blades to provide accurate spacing and support. Two independent guide [faces] members 32 and 33 are inserted in dove-tail slots 34 and 35, respectively. Alternatively, the guide[s] members may be bolted onto the mounting bracket 30. Guide[s] members 32 and 33 may be easily replaced when worn to a nonusable state. Mounting brackets such as those illustrated in FIGS. 3-5 are prepared by first mounting a guide member, 32 and 33, which includes a block of graphite as part of the guide member. Each guide member has a guide face, 32a and 33a, which is a layer of chemically vapor deposited silicon carbide formed on the graphite or ceramic block, Guide [faces] members 32 and 33 may be permanently attached to the mounting bracket 30, if so required by some application. Guide member 32 has a guide face 32a and guide member 33 has a guide face 33a. Each of these guide members 32 and 33 includes a block of graphite or ceramic, upon which each guide face of a CVD layer of Silicon Carbide is formed:

Single sided guides are used in applications with band saws as illustrated in FIG. 2 since a single blade is normally used with band saws. Guides may be used for stabilizing the blade and as a tensioner, taking up slack in a blade.

Each guide member 22, 26 has a guide face that includes a layer of [The guide surface is a] chemical vapor deposited silicon carbide, deposited on a silicon carbide ceramic or graphite surface. The CVD SiC surface provides a smooth, hard, dense, and chemical and thermoshock-resistant surface. Because of the smoothness of the surface, there is no abrasive or wearing action on the saw blade. The CVD SiC coating can be deposited on a base of any size or dimension and cannot be broken from the substrate since silicon and carbon are molecularly bonded with each other and the substrate. The CVD SiC can be ground to a surface smoothness of 0.2 μm to 0.07 μm. The CVD SiC surface for the guide is nonporous, chemical resistant, and can be used with light oil/water currently used to lubricate the surface of the saw blade in contact with the guide face, to provide minimum drag on the blade. The high ratio of thermal conductivity to thermal expansion provides a high temperature stability.

Figure 6:
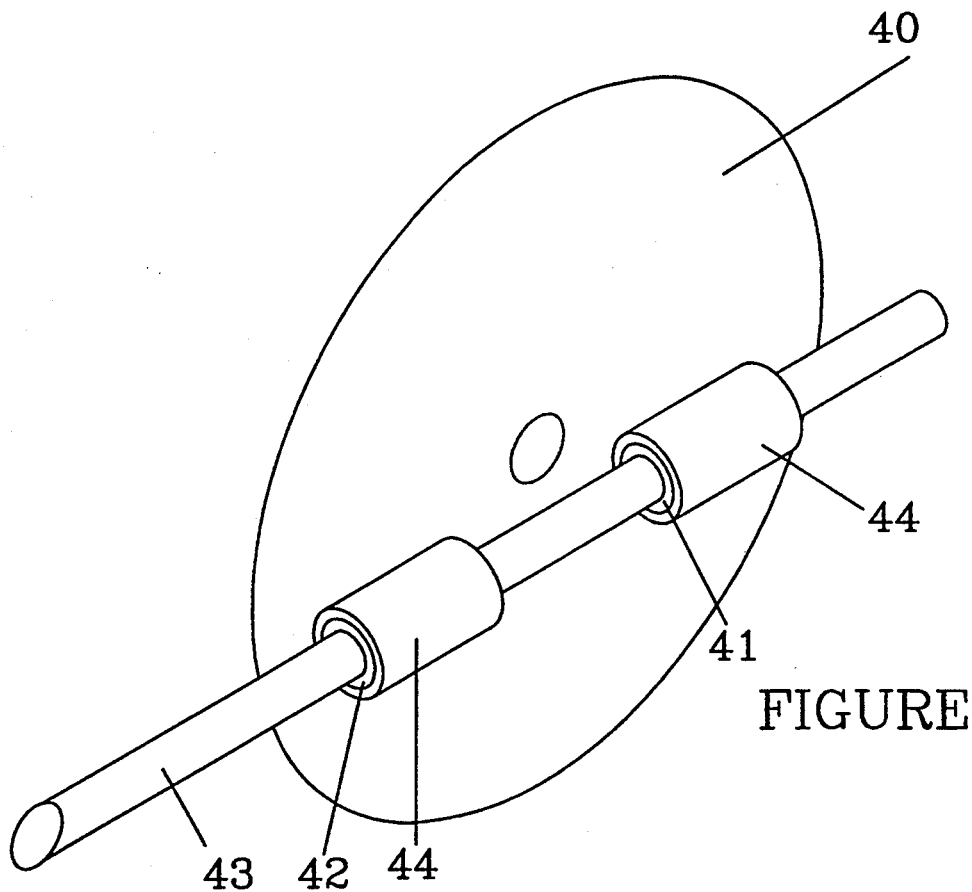
FIG. 6 illustrates rotatable guides with a circular saw.

FIG. 6 illustrates using rotatable saw blade guides to reduce the friction between the rotating blades and the rotatable CVD SiC faced guides. Blade 40 rotates and is stabilized by guide[s] members 41 and 42 which are rotatably mounted on shaft 43. Each roller guide member 41 and 42 has a guide face 44 which is a CVD SiC coating [44].

Figure 7:
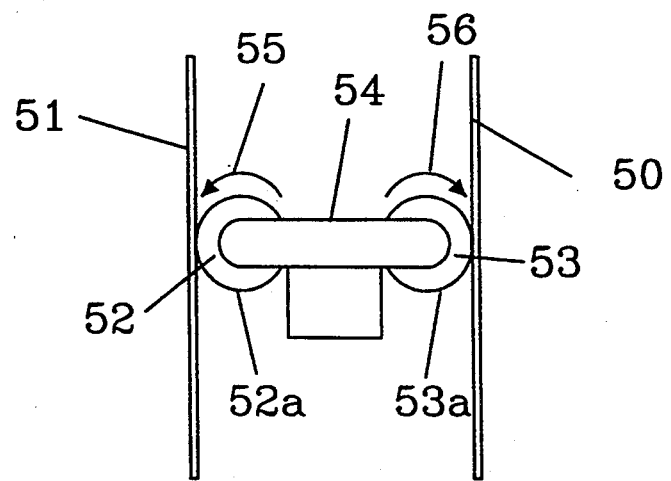
FIG. 7 illustrates rotatable guides spacing two circular saw blades.

FIG. 7 illustrates the use of rotatable CVD SiC guides between rotating saw blades to provide spacing and stabilization for the blades. Blade 50 rotates with and is stabilized by roller guide member 53, and blade 51 rotates with and is stabilized by roller guide member 52. Guide[s] members 52 and 53 are mounted on bracket 54 and rotate as indicated by arrows 55 and 56. Roller guide member 52 has a guide face 52a, and guide member 53 has a guide face 53a, each of which may include a CVD layer of silicon carbide.

The examples given herein are for purposes of illustration and brackets of different sizes and configurations may be used depending upon the size and means of mounting the various types of saw blades.

What is claimed:

1. A guide for use with saw blades, comprising:
   a mounting bracket having mounting slots therein;
   means for supporting at least oen guide member for contact with one of the saw blades including;
   two guide members, each guide member removably mounted in one of said mounting slots on said mounting bracket;
   each guide member comprising a base material forming at least one surface of the guide member for holding a guide face; and
   a guide face on the base material of each of said guide members comprised of a smooth coating of chemically vapor deposited silicon carbide.

2. The guide according to claim 1, wherein said base material is graphite.

3. The guide according to claim 1 wherein said guide face has a surface smoothness between 0.02 μm and 0.07 μm.

4. A guide for use with saw blades, comprising:
   a guide member;
   said guide member including a base material forming at least one surface of the guide member, said base material selected from the group of graphite and ceramic for holding a guide face;
   a guide face on the base material comprised of a layer of chemically vapor deposited silicon carbide and
   a means for rotationally supporting each guide member for rotation against a surface of one of the saw blades.

5. The guide according to claim 4, wherein said base material is graphite.

6. The guide according to claim 4, wherein said guide face has a surface smoothness between 0.02 μm and 0.07 μm.

7. The guide according to claim 4, wherein the means for rotationally supporting each guide member for rotation against a surface of one of the saw blades is a shaft.

8. The guide according to claim 4 wherein the means for rotationally supporting each guide member for rotation against a surface of one of the saw blades is a bracket.

* * * * *